(12) United States Patent
Ikeda et al.

(10) Patent No.: US 8,418,444 B2
(45) Date of Patent: Apr. 16, 2013

(54) METHOD FOR PURIFICATION OF EXHAUST GAS FROM INTERNAL COMBUSTION ENGINE

(75) Inventors: Masanori Ikeda, Himeji (JP); Naohiro Kato, Himeji (JP)

(73) Assignees: Umicore Shokubai Japan Co., Ltd., Osaka-Shi, Osaka (JP); Umicore Shokubai USA Inc, Auburn Hills, MI (US)

( * ) Notice: Subject to any disclaimer, the term of this patent is extended or adjusted under 35 U.S.C. 154(b) by 574 days.

(21) Appl. No.: 12/294,296

(22) PCT Filed: Mar. 23, 2007

(86) PCT No.: PCT/JP2007/056073
§ 371 (c)(1),
(2), (4) Date: Sep. 24, 2008

(87) PCT Pub. No.: WO2007/114082
PCT Pub. Date: Oct. 11, 2007

(65) Prior Publication Data
US 2009/0107122 A1 Apr. 30, 2009

(30) Foreign Application Priority Data
Mar. 30, 2006 (JP) .................. 2006-095334

(51) Int. Cl.
*F01N 3/00* (2006.01)
(52) U.S. Cl.
USPC .................. 60/295; 60/286; 60/300; 60/303; 422/172; 422/177; 422/182
(58) Field of Classification Search .................... 60/274, 60/285–287, 295–301
See application file for complete search history.

(56) References Cited

U.S. PATENT DOCUMENTS

| 3,909,452 | A | * | 9/1975 | Acres | ............................. 502/65 |
| 5,100,632 | A | | 3/1992 | Dettling et al. | |
| 5,131,224 | A | * | 7/1992 | Siewert et al. | .................. 60/274 |
| 5,248,251 | A | | 9/1993 | Betta et al. | |
| 5,524,432 | A | * | 6/1996 | Hansel | ............................. 60/274 |

(Continued)

FOREIGN PATENT DOCUMENTS

| JP | 60-043113 A | 3/1985 |
| JP | 8-052358 A | 2/1996 |
| JP | 2953409 B2 | 7/1999 |
| JP | 2001-248471 A | 9/2001 |

(Continued)

OTHER PUBLICATIONS

Office Action (Non-Final Rejection) dated Nov. 18, 2010, issued by the Korean Intellectual Property Office in corresponding Korean Patent Application No. 519980721220, and English translation thereof.

(Continued)

*Primary Examiner* — Thomas Denion
*Assistant Examiner* — Jesse Bogue
(74) *Attorney, Agent, or Firm* — Buchanan Ingersoll & Rooney PC

(57) ABSTRACT

Temperature range enabling combustion of high concentration hydrocarbon is enlarged, or high temperature gas is rapidly supplied to a latter part catalyst. Provided is a method for purification of exhaust gas from an internal combustion engine, by using a catalyst for increasing temperature of exhaust gas from an internal combustion engine, wherein hydrocarbon from 1,000 to 40,000 ppm by volume, as converted to methane, to the exhaust gas, is introduced at the upstream side of the catalyst for increasing temperature, along flow of the exhaust gas inside a passage of exhaust gas from the internal combustion engine.

14 Claims, 1 Drawing Sheet

U.S. PATENT DOCUMENTS

| | | | | |
|---|---|---|---|---|
| 5,736,482 | A * | 4/1998 | Durand et al. | 502/303 |
| 5,768,888 | A * | 6/1998 | Matros et al. | 60/274 |
| 5,884,473 | A * | 3/1999 | Noda et al. | 60/274 |
| 6,028,296 | A | 2/2000 | Yoro et al. | |
| 6,029,441 | A * | 2/2000 | Mizuno et al. | 60/274 |
| 6,214,307 | B1 * | 4/2001 | Okumura et al. | 423/213.5 |
| 6,576,203 | B2 * | 6/2003 | Abe et al. | 422/626 |
| 6,602,822 | B2 * | 8/2003 | Noda et al. | 502/339 |
| 6,644,021 | B2 | 11/2003 | Okada et al. | |
| 7,210,285 | B2 | 5/2007 | Sato et al | |
| 2002/0115730 | A1 * | 8/2002 | Allison et al. | 518/703 |
| 2004/0086441 | A1 * | 5/2004 | Hori et al. | 423/213.5 |
| 2005/0081443 | A1 * | 4/2005 | Aiello et al. | 48/198.3 |
| 2005/0112047 | A1 * | 5/2005 | Allison et al. | 423/418.2 |
| 2005/0266988 | A1 * | 12/2005 | Doumeki et al. | 502/339 |
| 2009/0005241 | A1 * | 1/2009 | Matsuo et al. | 502/303 |

FOREIGN PATENT DOCUMENTS

| | | |
|---|---|---|
| JP | 2002-295244 A | 10/2002 |
| JP | 2003-175318 A | 6/2003 |
| JP | 2004-108207 A | 4/2004 |
| JP | 2004-290827 A | 10/2004 |
| JP | 3747693 B2 | 12/2005 |
| TW | I243710 B | 11/2005 |

OTHER PUBLICATIONS

The First Office Action issued Mar. 8, 2010 in corresponding Chinese Patent Application No. 200780011027.9, and English language translation thereof.

Form PCT/ISA/210 (International Search Report) dated May 29, 2007.

Form PCT/ISA/237 (Written Opinion of the International Searching Authority) dated May 29, 2007.

International Preliminary Report on Patentability and Attached Written Opinion (Forms PCT/IB/326, PCT/IB/338, PCT/IB/373 and PCT/ISA/237) mailed by the International Bureau on Oct. 9, 2008 in corresponding PCT/JP2007/056073, The International Bureau of WIPO, Geneva, Switzerland.

Official Action dated May 11, 2011, issued by the Taiwanese Patent Office in corresponding Taiwanese Patent Application No. 096110431.

Supplementary European Search Report dated Jan. 27, 2011, issued in corresponding European Patent Application No. 07 73 9514.

Office Action issued on Oct. 11, 2011, in corresponding Taiwanese Patent Application No. 096110431, with an English translation thereof.

Office Action issued on Oct. 20, 2011, in corresponding Korean Patent Application No. 10-2008-7018576, with an English translation thereof.

Office Action issued on Nov. 2, 2011, in corresponding Japanese Patent Application No. 2008-508521, with an English translation thereof.

Office Action issued on Sep. 25, 2012, in corresponding Japanese Patent Application No. 2008-508521, with an English translation thereof.

* cited by examiner

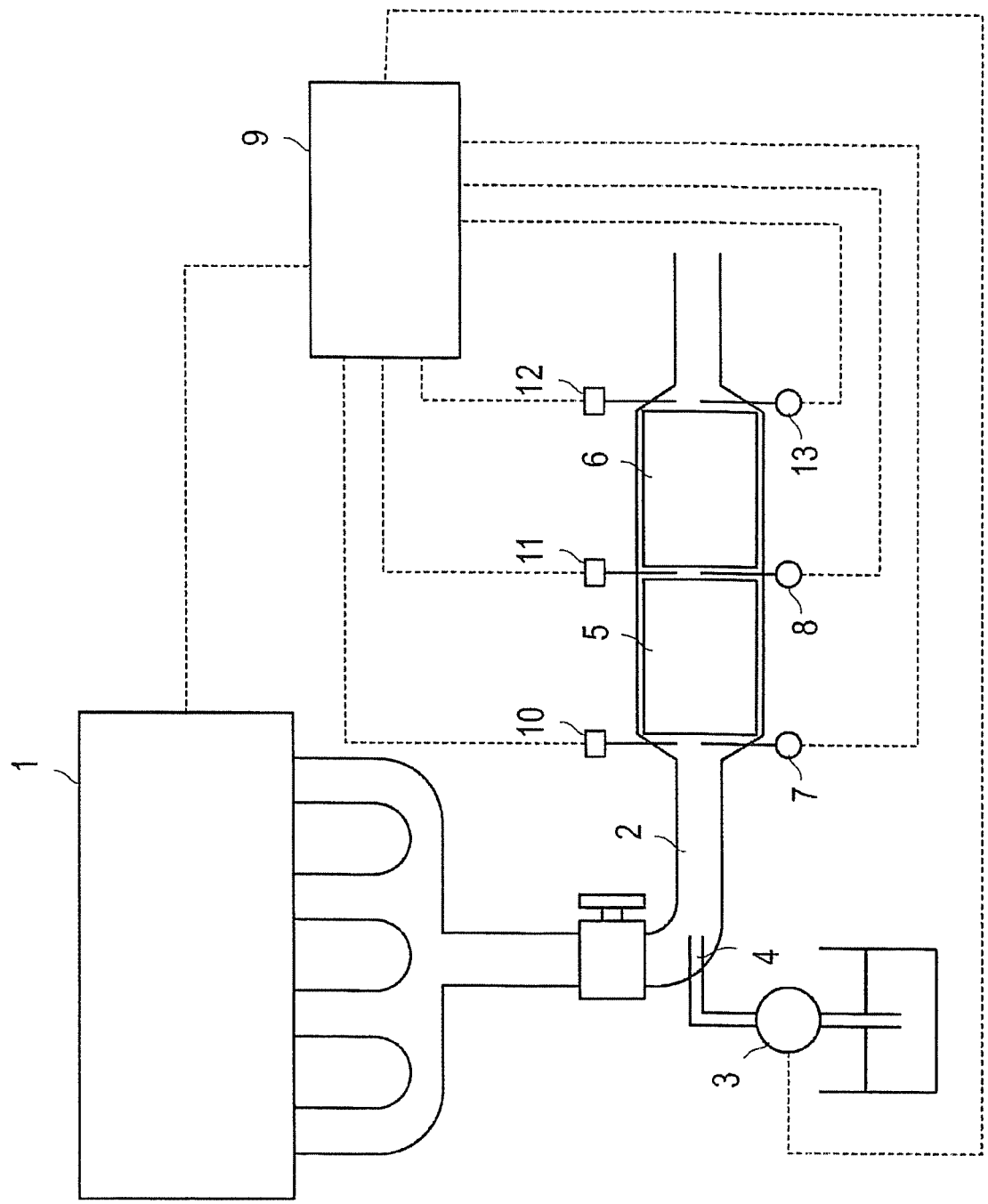

METHOD FOR PURIFICATION OF EXHAUST GAS FROM INTERNAL COMBUSTION ENGINE

TECHNICAL FIELD

The present invention relates to a method for purification of exhaust gas from an internal combustion engine, and in more detail the present invention relates to a purification method excellent in removing particulates and the like from exhaust gas from an internal combustion engine such as diesel engine.

BACKGROUND ART

In order to trap PM (a particulate material) such as black smoke or SOF, exhausted from an internal combustion engine such as diesel engine or the like, a diesel particulate filter is used, and accompanying with the use thereof, a problem is raised that PM is deposited inside the filter, resulting in increase in pressure loss.

Accordingly, as countermeasure for PM deposition, the filter is conventionally regenerated by arranging a heating apparatus such as an electric heater at the filter, to combust and remove PM by heating (JP-B-2953409).

However, such a regeneration method had a problem of increased consumption power and high running cost. In addition, there was also a problem that space occupied by the heater apparatus, other than the filter, was required, which limited installment place in arrangement thereof in a vehicle. In order to solve these problems, a purification apparatus for diesel exhaust gas has been proposed, which comprises a filter for trapping diesel engine particulates, a catalyst converter having good activity to hydrocarbon (HC) installed at the upstream side of an exhaust gas pipeline of the filter, and an HC control unit enabling supplying a large quantity of HC to the catalyst converter, and as this catalyst, platinum, palladium or the like has been disclosed (JP-A-60-043113).

In addition, a filter for diesel exhaust gas particles, where a catalytic component is coated on the filter, has also been disclosed. However, this method has a problem of limited temperature range enabling regeneration, due to continuous increase in exhaustion pressure up to about 370° C., although not requiring fuel addition for filter regeneration (U.S. Pat. No. 5,100,632).

Still more, in a purification system of exhaust gas from an internal combustion engine, provided with a continuous regeneration-type diesel particulate filter at the exhaust gas passage of an internal combustion engine, for removing a particulate material trapped by regeneration mode operation, when trapped amount of a particulate material in the filter for trapping a particulate material becomes a predetermined judgment value or higher, there has also been proposed a purification system of exhaust gas from an internal combustion engine, which comprises a trapped amount estimation means for estimating trapped amount of a particulate material trapped at the above filter, and a maximal injection amount control means for limiting maximal injection amount of an internal combustion engine, when a particulate material estimated by the trapping amount estimation means becomes predetermined judgment value or higher (JP-A-2004-108207).

In addition, it has been known that, in a method for removing nitrogen oxides, catalytic performance is lowered caused by storage of sulfur oxides such as SOx to a NOx storage catalyst used in removal of NOx, and a regeneration method has been proposed, where a large quantity of hydrocarbon is introduced for temperature increase also in recovering the performance. However, this method limits temperature range suitable to regeneration (JP-B-3747693).

DISCLOSURE OF INVENTION

A method described in the above literature has an advantage that production cost is lower and limitation of installment place is mitigated as compared with a method etc. by using an electric heater, however, on the other hand, it has a problem that a large quantity of hydrocarbon supply is required and there is poisoning caused by adhering of hydrocarbon onto a catalyst, because of a large quantity of hydrocarbon supply. This hydrocarbon poisoning tends to occur more easily when hydrocarbon is supplied at temperature of a part of a catalyst for increasing temperature not more than boiling point of hydrocarbon supplied, or also in higher concentration of hydrocarbon. It is because, low temperature at a part of the catalyst for increasing temperature delays combustion reaction rate of hydrocarbon, and high concentration of hydrocarbon makes supply rate of hydrocarbon faster than combustion treatment rate of a catalyst for increasing temperature. Therefore, a conventional method required a control to supply hydrocarbon, after temperature increase up to temperature at which combustion rate of hydrocarbon becomes fast, by control of an engine side, or supply a small quantity enabling sufficient combustion of hydrocarbon. However, such control lengthens regeneration time, resulting in adverse effect on running performance or environment. Accordingly, more rapid temperature increasing performance has been required, and in order to attain this, it is a problem to enhance combustion characteristics and temperature increasing performances for high concentration hydrocarbon at low temperature.

Accordingly, it is an object of the present invention to provide a novel method for increasing temperature of exhaust gas from an internal combustion engine.

It is other object of the present invention to provide a purification method excellent also in removal of particulates and the like from exhaust gas from an internal combustion engine, in particular, a diesel engine.

It is still another object of the present invention to provide a method for purification of exhaust gas from an internal combustion engine, which is a supply system of high concentration hydrocarbons fuel, enabling regeneration of a filter, stably for a long period.

The above objects can be attained particularly by the following aspects (1) to (14).

(1) A method for purification of exhaust gas from an internal combustion engine, by using a catalyst for increasing temperature of exhaust gas from an internal combustion engine, which comprises introducing hydrocarbon in an amount of from 1,000 to 40,000 ppm by volume, as converted to methane, to the exhaust gas, at the upstream side of the catalyst for increasing temperature, along flow of the exhaust gas inside a passage of exhaust gas from the internal combustion engine.

(2) The method according to the above (1), wherein the catalyst for increasing temperature is obtained by supporting a catalytically active component (A) consisting of (a) platinum, (b) an oxide of at least one metal selected from the group consisting of magnesium, an alkaline earth metal and an alkali metal, and (c) at least one member selected from the group of palladium and rhodium, on refractory inorganic oxide powder (B), and supporting the inorganic oxide powder having the catalytically active component supported thereon, on a refractory three-dimensional structure body.

(3) The method according to the above (2), wherein at least one metal selected from the group consisting of magnesium, an alkaline earth metal and an alkali metal is at least one member selected from the group consisting of magnesium, calcium, barium, strontium and potassium.

(4) The method according to the above (2) or (3), wherein the refractory inorganic oxide is at least one member selected from the group consisting of alumina, alumina-silica, zirconia, titania and zeolite.

(5) The method according to any one of the above (2) to (4), wherein mass ratio of (b')/(a) is from 0.2/1 to 20/1.

(6) The method according to claim 5, wherein mass ratio of platinum to total of palladium and/or rhodium in the catalyst for increasing temperature is from 20/1 to 1/1.

(7) The method according to any one of the above (1) to (6), wherein introduction temperature of the hydrocarbon is from 200 to 350° C.

(8) The method according to any one of the above (1) to (7), wherein amount of the hydrocarbon introduced is from 5,000 to 30,000 ppm by volume, as converted to methane, to the exhaust gas.

(9) The method according to any one of the above (1) to (8), wherein the catalyst for increasing temperature of exhaust gas is one having also exhaust gas purification capability.

(10) The method according to any one of the above (1) to (9), wherein a catalyst for exhaust gas purification is installed at the downstream side of the catalyst for increasing temperature of exhaust gas, to flow of the exhaust gas.

(11) The method according to the above (10), wherein the catalyst for exhaust gas purification is at least one member selected from the group consisting of a diesel particulate filter, an oxidizing catalyst and a NOx storage catalyst.

(12) The method according to the above (2), wherein the three-dimensional structure body of the catalyst for increasing temperature of exhaust gas is a honeycomb and/or a plug honeycomb or a pellet.

(13) An exhaust gas purification system from an internal combustion engine, comprising a hydrocarbon supply apparatus for introducing hydrocarbon in an amount of from 1,000 to 40,000 ppm by volume, as converted to methane, to the exhaust gas, and a catalyst for increasing temperature which is obtained by supporting a catalytically active component (A) consisting of (a) platinum, (b) an oxide of at least one metal selected from the group consisting of magnesium, an alkaline earth metal and an alkali metal, and (c) at least one noble metal selected from palladium and rhodium, on refractory inorganic oxide powder (B), and the inorganic oxide powder having the catalytically active component supported thereon, on a refractory three-dimensional structure body.

(14) Still more, the system according to (13), further comprising at least one member selected from the group consisting of a diesel particulate filter, an oxidizing catalyst and a NOx storage catalyst.

The present invention is one having the above constitution, and in particular, a system for supplying high concentration hydrocarbon, enabling stable increase in exhaust gas temperature, even when exhaust gas temperature is low, by using a catalyst containing, as a catalyst for increasing temperature, a catalytically active component (A) consisting of (a) platinum, (b) an oxide of at least one metal selected from the group consisting of magnesium, an alkaline earth metal and an alkali metal, and (c) at least one noble metal selected from the group consisting of palladium and rhodium. In particular, the effect becomes significant by presence of platinum, and an oxide of magnesium and/or an alkaline earth metal and/or an alkali metal in suitable ratio. In addition, because high concentration hydrocarbon can be introduced even when exhaust gas temperature is low, and thus exhaust gas temperature can be increased rapidly, the effect is significant.

As one cause for that, it is considered that magnesium and/or an alkaline earth metal and/or an alkali metal have electron donating property, and co-presence with platinum can activate platinum particle surface, and enhance combustion performance for high concentration hydrocarbon. In addition, as other cause for that, it is considered that presence of magnesium and/or an alkaline earth metal and/or an alkali metal makes platinum particles present at the inside of a coated layer contacted easily with high concentration hydrocarbon. It is considered that such a specific effect cannot be observed in the case where concentration of hydrocarbon is low or temperature in introduction of hydrocarbon is sufficiently high, that is, in the case where hydrocarbon is introduced in a gas state, because also platinum particles present at the inside of the coated layer easily react with hydrocarbon. On the other hand, in the case where concentration of hydrocarbon is high, or temperature in introduction of hydrocarbon is low, it is considered that, because hydrocarbon introduced in a liquid state is present, and dispersion thereof is not sufficient, platinum particles present at the inside of the coated layer are difficult to be effectively utilized in a reaction with hydrocarbon, and in the case where magnesium and/or an alkaline earth metal and/or an alkali metal are co-present, it is considered that a contact state of also platinum particles inside of the coated layer with hydrocarbon is improved, which makes a combustion reaction with hydrocarbon to occur easier.

Still more, by the above cause, the adhering of carbon-containing components derived from hydrocarbon, onto catalyst surface, which occurs when temperature of exhausted gas is low, is difficult to occur, and it enables a stable combustion reaction of hydrocarbon, and stable increase in exhaust gas temperature for a long period. In addition, by the same cause, in the case where a diesel particulate filter is installed at the latter part of the above catalyst for increasing temperature, stable filter regeneration becomes possible for a long period. Similarly, in the case where a NOx storage catalyst is installed at the latter part of the above catalyst for increasing temperature, accumulated sulfur oxides are removed stably by combustion.

BRIEF DESCRIPTION OF THE DRAWINGS

FIG. 1 is a schematic drawing showing outline of a purification apparatus of exhaust gas according to the present invention.

BEST MODE FOR CARRYING OUT THE INVENTION

Then, explanation will be given below in further detail on the present invention, with reference to the drawing. That is, FIG. 1 is one showing schematic drawing of a purification apparatus of exhaust gas from an internal combustion engine, according to the present invention.

That is, at an exhaustion pipe 2 communicating to an internal combustion engine 1, for example, a diesel engine, a temperature increasing region 5 filled with the catalyst for increasing temperature, and a filtering region 6 installed with, if necessary, the diesel particulate filter in communication to the downstream side thereof are installed by further communication thereto. And, there are mounted, at the exhaustion pipe 2 at the flow-in side of exhaust gas of the temperature increasing region 5, a fuel supply nozzle 4 installed with a check valve or the like (not shown), if necessary, and a fuel supply pump 3 communicating to the nozzle 4, as supply means of hydrocarbon-based liquid fuel for temperature increase. That is, in FIG. 1, a hydrocarbon supply apparatus is the fuel supply pump 3 and the fuel supply nozzle 4.

At the purification apparatus of exhausted gas having constitution as above, there are installed each of a temperature sensor 7 and a pressure sensor 10 at the entrance of the catalyst, and also at the exit part, each of a temperature sensor 8 and a pressure sensor 11, and still more, at the exit of the filtering region 6 provided with a filter, if necessary, each of temperature sensor 13 and a pressure sensor 12, so that temperature and pressure at the entrance part and the exit part of the catalyst can be measured, if necessary. In addition, a signal of each of the temperature sensors and the pressure sensors is connected so as to enter a controller 9, as well as a signal of the controller 9 is connected so as to enter a pump.

In addition, as other embodiment of the present invention, hydrocarbon-based liquid (for example, fuel) may be supplied directly to a cylinder of an internal combustion engine 1, for example, a diesel engine, by a signal of the controller 9, without installment of the pump 3 and the fuel supply nozzle 4. For example, hydrocarbon-based liquid (for example, fuel) may be supplied after completion of combustion and before completion of an exhaustion step of fuel inside the cylinder of the internal combustion engine.

Then, explanation will be given on action of the purification apparatus of exhausted gas with constitution as above. That is, as shown in FIG. 1, exhaust gas of the internal combustion engine 1, for example, a diesel engine, passes through the exhaustion pipe 2 and at the temperature increasing region 5 filled with the catalyst for increasing temperature, where high concentrated unreacted hydrocarbon (HC) contained in the exhaust gas is combusted, and is converted to water or carbon dioxide, which is exhausted outside via the filtering region 6 filled with the filter, or via a muffler (not shown).

On the other hand, particulates contained in exhaust gas are trapped into a particulate filter at the filtering region 6, however, because they are gradually accumulated, pressure onto the filter increases, and at the time when the pressure value reaches predetermined certain value and filter temperature reaches predetermined certain temperature, hydrocarbon-based liquid fuel is injected from the nozzle 4, and is supplied onto the catalyst for increasing temperature 5 of the temperature increasing region 5. Because the pressure sensor 11 installed between the temperature increasing region 5 and the filtering region 6, is designed to measure pressure of the filtering region 6, when the measurement value becomes equal to or higher than predetermined pressure, the fuel supply pump 3 is operated by direction of the controller 9, based on value received, while action of the pump 3 is stopped by direction of the controller 9, when the measurement value becomes equal to or lower than predetermined pressure.

In addition, when the temperature sensor 8 installed between the temperature increasing region 5 and the filtering region 6 becomes over predetermined value, for example, over 700° C., action of the pump 3 is stopped by direction of the controller 9. In addition, for example, in the case of light oil, temperature at which 90' or more components thereof is equal to or higher than boiling point, is about 330° C., and because at temperature below 330° C., high boiling point distillates in light oil are introduced into the temperature increasing region 5 as a liquid state, adherence thereof onto catalyst surface easily occurs, therefore, they are supplied from the pump 3 by small amount by direction of the controller 9. Still more, for example, at a temperature of below 200° C., action of the fuel supply pump 3 is stopped by direction of the controller 9. On the other hand, for example, at a temperature of equal to or higher than 330° C. and below 500° C., supply amount of hydrocarbon-based fuel is adjusted so as to reach objective temperature.

The pressure sensor 10 at the entrance of temperature increasing region 5 is installed, in the case where the pressure sensor 11 is not installed between the temperature increasing region 5 and the filtering region 6, and designed to detect pressure loaded at the temperature increasing region 5 and a filtering region, and measures pressure loaded at the catalyst for increasing temperature and the filtering region by difference between the pressure sensor 10 and the pressure sensor 12.

By the control unit 9, a fuel supply signal is sent to a fuel injection apparatus to start filter regeneration control (fuel supply), in general, when temperature and pressure information in front of and at the back of the filter (or inside the filter) is sent to the control unit, after measurement of pressure loaded at the filter, and in the case where the value is over a certain value. Also during fuel supply, pressure value of the filter is sent to the control unit, by the pressure sensor, and at the time when the pressure value decreases down to a certain value, the regeneration control is stopped.

In this case, as hydrocarbon, any one may be used as long as it is hydrocarbon enabling to generate heat by fuel, and includes methane, ethane, propane, gasoline, methanol, ethanol, dimethyl ether, light oil or the like, and preferably light oil. Use amount thereof is from 1,000 to 40,000 ppm by volume, preferably from 5,000 to 30,000 ppm by volume, still more preferably from 5,000 to 20,000 ppm by volume, and most preferably from 5,000 to 15,000 ppm by volume, as converted to methane, relative to the exhaust gas.

It should be noted that an introduction place of hydrocarbon may be any place at the upstream of the catalyst for increasing temperature, but preferably at the upstream of the catalyst for increasing temperature, after combustion of an engine. In addition, "after combustion of an engine" may be the downstream of exhausted gas from the engine, or may be inside the engine.

In this case, it is preferable that introduction temperature of hydrocarbon is from 200° C. to 600° C., preferably from 200° C. to 350° C., and still more preferably from 200° C. to 300° C.

In addition, situation is similar also in the case where hydrocarbon-based liquid (fuel) is directly supplied into an internal combustion engine.

It is preferable that the catalyst for increasing temperature to be used in the present invention is obtained by supporting a catalytically active component (A) consisting of (a) platinum, (b) an oxide of at least one metal selected from the group consisting of magnesium, an alkaline earth metal and an alkali metal, and (c) at least one noble metal selected from palladium and rhodium, on refractory inorganic oxide powders (B), and coating the inorganic oxide powder having the catalytically active component supported thereon, onto a refractory three-dimensional structure body.

Essential a catalytically active component to be used in the present invention, are platinum, an oxide of magnesium and/or an alkaline earth metal and/or an alkali metal, and palladium and/or rhodium.

As a form of platinum and rhodium, a metal form is more preferable than an oxide, and as a form of palladium, an oxide form is more preferable than a metal. Use amount of platinum, palladium and/or rhodium (in total) is usually from 0.1 to 20 g, and preferably from 0.5 to 10 g, per 1 L of a refractory three-dimensional structure body. The use amount below 0.1 g provides insufficient catalytic activity at the initial stage and after long period of use, on the other hand, the use amount over 20 g does not provide catalytic activity proportional to the use amount, therefore it is not preferable.

In addition, mass ratio of platinum (a) relative to palladium and/or rhodium (c) (in total) in the catalyst for increasing temperature, that is (a)/(c), is from 20/1 to 1/1, preferably from 5/1 to 2/1.

As a starting raw material of platinum, an inorganic compound such as platinum nitrate, dinitroammine platinum, platinic chloride, an organic compound such as bis platinum is included, and in addition, as a starting raw material of rhodium, rhodium nitrate, rhodium chloride, rhodium acetate or the like is included.

As magnesium and/or an alkaline earth metal and/or an alkali metal, magnesium, calcium, barium, strontium, sodium, potassium or the like is included, and preferably magnesium, calcium, barium, strontium, potassium or the like, and it is usually an oxide form. Mass ratio of magnesium, an alkaline earth metal or an alkali metal (b') (total of magnesium, an alkaline earth metal or an alkali metal) in these oxides (b), relative to platinum (a), that is (b')/(a), is from 0.2/1 to 20/1, more preferably from 0.3/1 to 17/1, still more preferably from 0.6/1 to 5.4/1, particularly preferably from 0.6/1 to 2.2/1, and most preferably from 0.6/1 to 1/1.

In addition, as a starting raw material of an oxide of magnesium and/or an alkaline earth metal and/or an alkali metal, there is included a nitrate salt, a halide, an acetate salt or the like, and any one may be adopted as long as it is one converted to an oxide form by calcination under oxidizing atmosphere.

In the present invention, reason for formulating the oxide of magnesium and/or an alkaline earth metal and/or an alkali metal in the catalyst for increasing temperature is that, as shown in Table 1, although there is no big difference in hydrocarbon conversion rate and temperature increase by presence or absence of addition of an oxide of the component (b) at a temperature of 200° C. and 250° C., the difference becomes very large at the vicinity of 225° C., as compared with the case of no addition. That is, even at a low temperature region where hydrocarbon cannot be combusted in the case where the component (b) is not added, combustion becomes possible, and also supply of high temperature to the latter part becomes possible by the addition of the component (b). Still more, because effect obtained by copresence of platinum with magnesium and/or an alkaline earth metal and/or an alkali metal in this way varies, depending on concentration of hydrocarbon supplied, amount of a noble metal contained in the catalyst, space velocity or the like, supply temperature of hydrocarbon is not limited at specified temperature but it may be set at temperature suitable to engine control, by formulation ratio of platinum and magnesium and/or an alkaline earth metal and/or an alkali metal, the effect becomes significant.

These noble metals (platinum, palladium and/or rhodium) and oxides of magnesium and/or an alkaline earth metal and/or an alkali metal may form slurry by simultaneously formulating solutions thereof to refractive inorganic oxide powders, or may be supported onto the refractive inorganic oxide by separate formation of slurry.

As the refractive inorganic oxide components used in the present invention, any one usually used as a catalyst carrier may be adopted, for example, alumina such as α, ν, δ, η, θ, zeolite, titania, zirconia, silica, or a composite oxide thereof, for example, alumina-tiania, alumina-zirconia, titania-zirconia, alumina-silica or the like may be used. These refractive inorganic oxide components may be used alone as one kind, or may be used by combination of two or more kinds. Preferably, it is at least one member selected from the group consisting of alumina, alumina-silica, zirconia, titania and zeolite, more preferably alumina. Usually, alumina is powder form.

Use amount of the refractory inorganic oxide is usually from 10 to 300 g, preferably from 50 to 150 g, per 1 L of the three-dimensional structure body. The amount below 10 g is not capable of dispersing a noble metal sufficiently, and provides insufficient durability, on the other hand, the amount over 300 g deteriorates a contact state between the noble metal and hydrocarbon introduced for temperature increase, resulting in difficulty in temperature increase, and thus not preferable.

BET specific surface area of the refractory inorganic oxide is preferably from 50 to 750 $m^2/g$, and more preferably from 150 to 750 $m^2/g$. In addition, average particle diameter of the refractory inorganic oxide powder is preferably from 0.5 to 150 μm, and more preferably from 1 to 100 μm.

As the three-dimensional structure body used in the present invention, a heat resistant carrier such as a honeycomb carrier is included, however, a one-piece-molded type honeycomb structure body is preferable and, for example, a monolith honeycomb carrier, a metal honeycomb carrier, a plug honeycomb carrier, a pellet carrier or the like may be included. Among these, use of the monolith honeycomb carrier, the plug honeycomb carrier, and the pellet carrier is preferable, and use of the monolith honeycomb carrier, the plug honeycomb carrier is more preferable.

As the monolith honeycomb carrier, any one usually called a ceramic honeycomb carrier may be used, and in particular, a honeycomb carrier made of cordierite, mulite, a-alumina, zirconia, titania, titanium phosphate, aluminium titanate, betalite, spodumene, alumino silicate, magnesium silicate, or the like is preferable, and among these, cordierite type one is particularly preferable. Other than these, one converted to a one-piece structure body by using anti-oxidative and heat resistant metal such as stainless steel, an Fe—Cr—Al alloy may be used.

These monolith honeycomb carriers are produced by an extrusion method or a method for winding and fixing a sheet-like element or the like. Shape of gas passage opening (cell shape) thereof may be any of hexagonal, quadrangle, triangle or corrugation shape. A cell density (cell number/unit cross-sectional area) of from 100 to 600 cells/$inch^2$ is sufficiently usable, and preferably from 200 to 500 cells/$inch^2$ In addition, rib thickness is preferably from 3 to 6 mm.

In addition, as a plug honeycomb, there are many kinds and a known one may be used, however, for example, a filter made of cordierite, a filter made of high heat resistant silicon carbide, or the like is included. In the case of a plug honeycomb, it is preferable to have a mesh opening of from 300 to 400 cells per cross-sectional area of one $inch^2$, and pore diameter of a rib is preferably from 10 to 30 μm.

It is preferable that the catalyst for exhaust gas purification has still more purification capability of exhausted gas. "Purification capability of exhausted gas" specifically indicates, for example, capability of converting a part of hydrocarbon in exhaust gas to carbon dioxide and water, capability of converting a part of carbon monoxide to carbon dioxide, and capability of converting a part of nitrogen oxides to nitrogen.

Explanation will be given specifically on a preparation method of the catalyst for increasing temperature. An aqueous solution of a platinum salt and an aqueous solution of a magnesium salt and/or an alkaline earth metal salt and/or an alkali metal salt are mixed and sufficiently stirred, and then the mixed solution is impregnated to refractory inorganic oxide powders and dried, followed by calcining at 300 to 800° C., preferably at 400 to 600° C., for 15 minutes to 2 hours, preferably for 30 minutes to 1 hour. Then, an aqueous solution of palladium salt and/or rhodium salt is impregnated to the refractory inorganic oxide powders, and subjected to drying and calcining similarly. The resulting noble metal-containing powders, refractory inorganic oxide, zeolite powders, if necessary, and an additional noble metal salt solution, if necessary, are subjected to wet grinding to prepare aqueous slurry. This slurry is coated on the three-dimensional structure body, and by calcining it at 300° C. to 800° C., preferably at 400 to 600° C., for 15 minutes to 2 hours, preferably for 30 minutes to 1 hour, the catalyst for increasing temperature is obtained.

As other method for producing the catalyst for increasing temperature, aqueous slurry is prepared by subjecting an aqueous solution of a platinum salt, an aqueous solution of a magnesium salt and/or an alkaline earth metal salt and/or an alkali metal salt, an aqueous solution of palladium salt and/or rhodium salt, refractory inorganic oxide powders, along with, if necessary, zeolite powders, to wet grinding. This slurry is coated on the three-dimensional structure body, and by calcining it at 300° C. to 800° C., preferably at 400 to 600° C., for 15 minutes to 2 hours, preferably for 30 minutes to 1 hour, the catalyst for increasing temperature is obtained. In view of durability, the resulting catalyst for increasing temperature may be calcined still more.

As the zeolite powders to be used, if necessary, there is BEA type, MFI type, FER type, FAU type, MOR type or the like, and not especially limited, because preferable crystal structure differs depending on objectives.

In addition, as the catalyst for exhaust gas purification installed at the downstream side of the catalyst for increasing temperature, there is included the three-dimensional structure body such as cordierite, silicon carbide, stainless steel, for example, a honeycomb carrier capable of trapping a particulate material, and not coated with catalyst components, for example, a diesel particulate filter, a plug filter or the like, or one coated with catalyst components similar to the above catalyst for increasing temperature on the above filter, other one requiring high temperature at the process of using a catalyst, or the like. Still more, as other catalyst for exhaust gas purification, an oxidizing catalyst, a NOx storage catalyst or the like is included. These catalysts for exhaust gas purification may be used alone or in combination of two or more kinds. It is preferable to use at least the diesel particulate filter, the oxidizing catalyst and the NOx storage catalyst, and more preferable to use at least the diesel particulate filter. As the diesel particulate filter, the oxidizing catalyst and the Nox storage catalyst, usually known one may be used.

EXAMPLES

Then, explanation will be given below in further detail on a method of the present invention with reference to Examples.

Example 1

Water was added to a dinitroamine platinum aqueous solution in an amount equivalent to 2 g of platinum, a magnesium acetate tetrahydrate in an amount equivalent to 0.6 g of magnesium, a palladium nitrate aqueous solution in an amount equivalent to 0.5 g of palladium, and 120 g of alumina ($\gamma$-$Al_2O_3$, with a BET specific surface area of 200 m²/g, and an average primary particle diameter of 6 µm), to be subjected to wet grinding in a ball mill. Similar operation was repeated several times to prepare 1500 g in total of aqueous slurry. This slurry was wash-coated onto 1 L of monolith honeycomb carrier made of cordierite, having 400 cells per 1 square inch of cross-sectional area, and subjected to drying at 120° C. for 8 hours, and then calcining at 500° C. for 1 hour to obtain a catalyst A. Supported amount of each component of the resulting catalyst A, per 1-L of monolith carrier, was 2 g of platinum, 0.5 g of palladium and 0.6 g of magnesium.

Example 2

A catalyst B was obtained by a similar method as in Example 1, except that instead of magnesium acetate tetrahydrate in an amount equivalent to 0.6 g of magnesium, magnesium acetate tetrahydrate in an amount equivalent to 1.2 g of magnesium was used.

Example 3

A catalyst C was obtained by a similar method as in Example 1, except that instead of magnesium acetate tetrahydrate in an amount equivalent to 0.6 g of magnesium, magnesium acetate tetrahydrate in an amount equivalent to 6 g of magnesium was used.

Example 4

A catalyst D was obtained by a similar method as in Example 1, except that instead of magnesium acetate tetrahydrate in an amount equivalent to 0.6 g of magnesium, calcium acetate monohydrate in an amount equivalent to 1.0 g of calcium was used.

Example 5

A catalyst E was obtained by a similar method as in Example 4, except that instead of calcium acetate monohydrate in an amount equivalent to 1.0 g of calcium, calcium acetate monohydrate in an amount equivalent to 2.0 g of calcium was used.

Example 6

A catalyst F was obtained by a similar method as in Example 4, except that instead of calcium acetate monohydrate in an amount equivalent to 1.0 g of calcium, calcium acetate monohydrate in an amount equivalent to 9.9 g of calcium was used.

Example 7

A catalyst G was obtained by a similar method as in Example 1, except that instead of magnesium acetate tetrahydrate in an amount equivalent to 0.6 g of magnesium, strontium acetate hemihydrate in an amount equivalent to 2.2 g of strontium was used.

Example 8

A catalyst H was obtained by a similar method as in Example 7, except that instead of strontium acetate hemihydrate in an amount equivalent to 2.2 g of strontium, strontium acetate hemihydrate in an amount equivalent to 4.3 g of strontium was used.

Example 9

A catalyst I was obtained by a similar method as in Example 8, except that instead of strontium acetate hemihydrate in an amount equivalent to 2.2 g of strontium, strontium acetate hemihydrate in an amount equivalent to 21.6 g of strontium was used.

Example 10

A catalyst J was obtained by a similar method as in Example 1, except that instead of magnesium acetate tetrahydrate in an amount equivalent to 0.6 g of magnesium, barium acetate in an amount equivalent to 3.4 g of barium was used.

Example 11

A catalyst K was obtained by a similar method as in Example 10 except that instead of barium acetate in an amount equivalent to 3.4 g of barium, barium acetate in an amount equivalent to 6.8 g of barium was used.

Example 12

A catalyst L was obtained by a similar method as in Example 10, except that instead of barium acetate in an amount equivalent to 3.4 g of barium, barium acetate in an amount equivalent to 33.9 g of barium was used.

Example 13

A catalyst M was obtained by a similar method as in Example 1, except that instead of magnesium acetate tetrahydrate in an amount equivalent to 0.6 g of magnesium, potassium acetate in an amount equivalent to 1.0 g of potassium was used.

Example 14

A catalyst N was obtained by a similar method as in Example 13, except that instead of potassium acetate in an amount equivalent to 1.0 g of potassium, potassium acetate in an amount equivalent to 1.9 g of potassium was used.

Example 15

A catalyst O was obtained by a similar method as in EXAMPLE 13, except that instead of potassium acetate in an amount equivalent to 1.0 g of potassium, potassium acetate in an amount equivalent to 9.7 g of potassium was used.

Comparative Example 1

A catalyst Z was obtained by a similar method as in Example 1, except that magnesium acetate tetrahydrate was not used.

Evaluation Example 1

Evaluation of Catalysts

The catalysts prepared in the above Examples and Comparable Example were subjected to calcination at 800° C. for 16 hours in air.

In a exhaust gas purification apparatus shown in FIG. 1 installed on a chassis dynamo meter, each of the catalysts for increasing temperature (A) to (O) or the comparative catalyst (Z), prepared in Example 1 to 15 or Comparative Example 1, respectively, was filled, as the catalyst for increasing temperature at the temperature increasing region 5. In a 2 L direct-injection diesel engine shown in FIG. 2, the temperature sensor 7 at the frontward of the catalyst for increasing temperature 5 was set to 200° C., 225° C. and 250° C., under a space velocity of 50000 h$^{-1}$. Then, light oil was supplied from a fuel supply nozzle, in an amount equivalent to 10,000 ppm by volume (converted to methane) of hydrocarbon concentration flowing to the catalyst for increasing temperature. Hydrocarbon (HC) conversion rate and temperature increase (temperature increase width) after hydrocarbon supply, determined from difference between the temperature sensor 7 at the entrance of the catalyst for increasing temperature, and a temperature sensor 8 at the exit, were examined ten minutes after supply start, and results shown in Table 1 were obtained.

TABLE 1

| | | Mass ratio to | HC Conversion Rate [%] | | | Temperature Increase Width [° C.] | | |
|---|---|---|---|---|---|---|---|---|
| | Catalyst | Noble Metal | 200° C. | 225° C. | 250° C. | 200° C. | 225° C. | 250° C. |
| EXAMPLE 1 | A | Mg/Pt = 0.3 | 9 | 41 | 82 | 0 | 147 | 362 |
| EXAMPLE 2 | B | Mg/Pt = 0.6 | 10 | 73 | 82 | 3 | 312 | 362 |
| EXAMPLE 3 | C | Mg/Pt = 3.0 | 11 | 62 | 84 | 7 | 254 | 373 |
| EXAMPLE 4 | D | Ca/Pt = 0.5 | 5 | 25 | 81 | 0 | 71 | 356 |
| EXAMPLE 5 | E | Ca/Pt = 1.0 | 9 | 62 | 82 | 0 | 254 | 362 |
| EXAMPLE 6 | F | Ca/Pt = 5.0 | 7 | 53 | 81 | 0 | 207 | 356 |
| EXAMPLE 7 | G | Sr/Pt = 1.1 | 5 | 28 | 79 | 0 | 85 | 345 |
| EXAMPLE 8 | H | Sr/Pt = 2.2 | 9 | 65 | 81 | 0 | 269 | 356 |
| EXAMPLE 9 | I | Sr/Pt = 10.8 | 8 | 40 | 83 | 0 | 142 | 367 |
| EXAMPLE 10 | J | Ba/Pt = 1.7 | 4 | 52 | 85 | 0 | 202 | 378 |
| EXAMPLE 11 | K | Ba/Pt = 3.4 | 8 | 67 | 82 | 0 | 280 | 362 |
| EXAMPLE 12 | L | Ba/Pt = 17.0 | 9 | 55 | 83 | 0 | 217 | 367 |
| EXAMPLE 13 | M | K/Pt = 0.5 | 8 | 39 | 79 | 0 | 137 | 345 |
| EXAMPLE 14 | N | K/Pt = 1.0 | 9 | 63 | 79 | 0 | 259 | 345 |
| EXAMPLE 15 | O | K/Pt = 4.8 | 10 | 53 | 82 | 0 | 207 | 362 |
| COMPARATIVE EXAMPLE 1 | Z | No addition | 9 | 13 | 83 | 0 | 17 | 369 |

Example 16

Water was added to a dinitroamine platinum aqueous solution in an amount equivalent to 4.0 g of platinum, a magnesium acetate tetrahydrate in an amount equivalent to 1.3 g of magnesium, a palladium nitrate aqueous solution in an amount equivalent to 1.0 g of palladium, and 140 g of alumina ($\gamma$-$Al_2O_3$, with a BET specific surface area of 200 $m^2$/g, and an average primary particle diameter of 6 μm), to be subjected to wet grinding in a ball mill. Similar operation was repeated several times to prepare 3500 g in total of aqueous slurry. This slurry was wash-coated onto 2.47 L of monolith honeycomb carrier made of cordierite, having 400 cells per 1 square inch of cross-sectional area, and subjected to drying at 120° C. for 8 hours, and then calcining at 500° C. for 1 hour to obtain a catalyst P. Supported amount of each component of the resulting catalyst A, per 1-L of monolith carrier, was 4.0 g of platinum, 1.0 g of palladium and 1.3 g of magnesium.

Comparative Example 2

A catalyst Z2 was obtained by a similar method as in Example 16, except that magnesium acetate tetrahydrate was not used.

Evaluation Example 2

The catalysts prepared in the above Example 16 and Comparative Example 2 were subjected to calcining at 800° C. for 16 hours in air.

In a exhaust gas purification apparatus shown in FIG. 1 installed over a chassis dynamo meter, the catalysts for increasing temperature (P) prepared in Example 16 or the catalysts for increasing temperature (Z2) was filled, as the catalyst for increasing temperature, at the temperature increasing region 5, and at the backward thereof, a diesel particulate filter was installed. In a 3.2-L direct-injection diesel engine, particulates were accumulated on the filter, by operation of the engine at 2000 rpm, till pressure loaded at the front of the filter became 8 kPa. Then, entrance temperature of the oxidizing catalyst was set at 300° C., and light oil was added in a flow amount of 45 mL/minute, so as to increase entrance temperature of the oxidizing catalyst up to 600° C. Exit temperature of the oxidizing catalyst, and pressure loaded at the front of the filter, after 25 minutes from light oil addition, were examined. The results are shown in Table 2.

TABLE 2

| Catalyst | Temperature at Oxidizing catalyst Exit | Pressure at Filter Entrance |
|---|---|---|
| P | 589° C. | 3.3 |
| Z2 | 351° C. | 4.1 |

The invention claimed is:

1. A method for purification of exhaust gas from an internal combustion engine, by using a catalyst for increasing temperature of exhaust gas from an internal combustion engine, which comprises introducing hydrocarbon in an amount of from 1,000 to 40,000 ppm by volume, measured as methane, to the exhaust gas, at the upstream side of the catalyst for increasing temperature, along flow of the exhaust gas inside a passage of exhaust gas from the internal combustion engine, wherein the catalyst for increasing temperature is obtained by supporting a catalytically active component (A) consisting essentially of (a) platinum, (b) an oxide of at least one metal selected from the group consisting of magnesium, an alkaline earth metal and an alkali metal, and (c) palladium, on refractory inorganic oxide powder (B), and supporting the inorganic oxide powder having the catalytically active component supported thereon, on a refractory three-dimensional structure body, and mass ratio of (a)/(c) in said catalyst for increasing temperature is from 20/1 to 1/1, and wherein mass ratio of magnesium, an alkaline earth metal and an alkali metal (b'), in (b) in said catalyst for increasing temperature relative to platinum (a), that is (b')/(a), is from 0.2/1 to 20/1.

2. The method according to claim 1, wherein at least one metal selected from the group consisting of magnesium, an alkaline earth metal and an alkali metal is at least one member selected from the group consisting of magnesium, calcium, barium, strontium and potassium.

3. The method according to claim 1, wherein the refractory inorganic oxide is at least one member selected from the group consisting of alumina, alumina-silica, zirconia, titania and zeolite.

4. The method according to claim 1, wherein introduction temperature of the hydrocarbon is from 200 to 350° C.

5. The method according to claim 1, wherein amount of the hydrocarbon introduced is from 5,000 to 30,000 ppm by volume, measured as methane, relative to the exhaust gas.

6. The method according to claim 1, wherein the catalyst for increasing temperature of exhaust gas is one having also exhaust gas purification capability.

7. The method according to claim 1, wherein a catalyst for exhaust gas purification is installed at the downstream side of the catalyst for increasing temperature of exhaust gas, to flow of the exhaust gas.

8. The method according to claim 7, wherein the catalyst for exhaust gas purification is at least one member selected from the group consisting of a diesel particulate filter, an oxidizing catalyst and a NOx storage catalyst.

9. The method according to claim 1, wherein the three-dimensional structure body of said catalyst for increasing temperature of exhaust gas is a monolith honeycomb, a plug honeycomb or a pellet.

10. The method according to claim 2, wherein the refractory inorganic oxide is at least one member selected from the group consisting of alumina, alumina-silica, zirconia, titania and zeolite.

11. The method according to claim 2, wherein introduction temperature of the hydrocarbon is from 200 to 350° C.

12. The method according to claim 3, wherein introduction temperature of the hydrocarbon is from 200 to 350° C.

13. An exhaust gas purification system from an internal combustion engine, comprising a hydrocarbon supply apparatus for introducing hydrocarbon in an amount of from 1,000 to 40,000 ppm by volume, measured as methane, to the exhaust gas, and a catalyst for increasing temperature which is obtained by supporting a catalytically active component (A) consisting essentially of (a) platinum, (b) an oxide of at least one metal selected from the group consisting of magnesium, an alkaline earth metal and an alkali metal, and (c) palladium, on refractory inorganic oxide powder (B), and supporting the inorganic oxide powder having the catalytically active component supported thereon, on a refractory three-dimensional structure body, wherein mass ratio of (a)/(c) in said catalyst for increasing temperature is from 20/1 to 1/1, and wherein mass ratio of magnesium, an alkaline earth metal and an alkali metal (b'), in (b) in said catalyst for increasing temperature relative to platinum (a), that is (b')/(a), is from 0.2/1 to 20/1.

14. The system according to claim 13, further comprising at least one member selected from the group consisting of a diesel particulate filter, an oxidizing catalyst and a NOx storage catalyst.

\* \* \* \* \*